United States Patent [19]

Stessen

[11] Patent Number: 4,689,845
[45] Date of Patent: Sep. 1, 1987

[54] IMPULSE PROPULSION UNIT

[75] Inventor: Lothar Stessen, Lauf, Fed. Rep. of Germany

[73] Assignee: DIEHL GmbH & Co., Nuremberg, Fed. Rep. of Germany

[21] Appl. No.: 867,217

[22] Filed: May 21, 1986

[30] Foreign Application Priority Data

Jun. 13, 1985 [DE] Fed. Rep. of Germany ....... 3521204

[51] Int. Cl.$^4$ .......................... F02K 1/00; F02K 9/00; C06D 5/00
[52] U.S. Cl. ........................................ 60/228; 60/253; 60/255; 102/530; 244/322
[58] Field of Search ................. 60/201, 228, 224, 253, 60/254, 255, 257, 251, 252, 233; 102/530, 531; 244/3.22

[56] References Cited

U.S. PATENT DOCUMENTS

| | | | |
|---|---|---|---|
| 3,226,928 | 1/1966 | Webb et al. | 60/253 |
| 3,316,719 | 5/1967 | Loprete | 60/255 |
| 3,943,856 | 3/1976 | Ramont et al. | 102/531 |
| 4,300,736 | 11/1981 | Miles | 244/3.22 |
| 4,408,735 | 10/1983 | Metz | 244/3.22 |
| 4,444,119 | 4/1984 | Caponi | 102/530 |
| 4,531,093 | 7/1985 | Raynaud et al. | 244/3.22 |

FOREIGN PATENT DOCUMENTS 3526738  5/1985  Fed. Rep. of Germany .

Primary Examiner—Louis J. Casaregola
Assistant Examiner—Timothy S. Thorpe
Attorney, Agent, or Firm—Scully, Scott, Murphy & Presser

[57] ABSTRACT

An impulse propulsion unit or pulse-generating impeller mechanism for the lateral acceleration of a projectile, including a hollow cylindrical member, having an outer shell surface which is passed through by nozzles which are peripherally offset relative to each other, and each of which connects into a propellant chamber in the interior of the hollow-cylindrical shell or casing. The propellant chamber is in the shape of an axially elongated section of the hollow wall of a cylinder in which the annular space between the cylindrical inner and outer walls is subdivided through the intermediary of radial separating walls into peripherally neighboring chamber.

9 Claims, 1 Drawing Figure

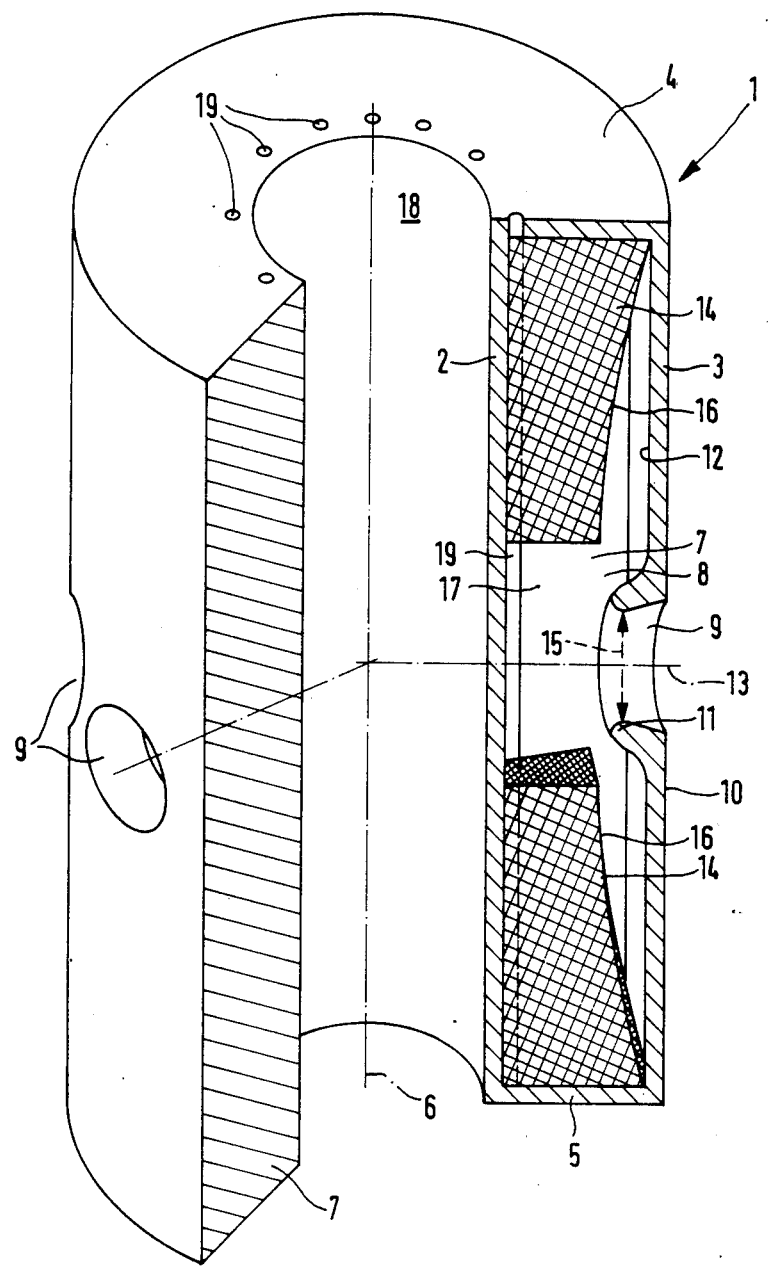

IMPULSE PROPULSION UNIT

BACKGROUND OF THE INVENTION

1. Field of the Invention

The present invention relates to an impulse propulsion unit or pulse-generating impeller mechanism for the lateral acceleration of a projectile, including a hollow cylindrical member, having an outer shell surface which is passed through by nozzles which are peripherally offset relative to each other, and each of which connects into a propellant chamber in the interior of the hollow-cylindrical shell or casing.

2. Discussion of the Prior Art

An impeller arrangement of this type which includes a plurality of gas outlet nozzles has become known from the disclosure of Canadian Patent No. 1 156 512. In that instance, the nozzles are each supplied from a combustion chamber which extends circularly in the plane of the nozzle axis. This results in the need for a relatively large spatial demand on the construction of an impeller arrangement which is to be equipped with the largest possible number of nozzles arranged annularly or ring-shaped in a single plane; and consequently, at a limited caliber for the projectile, with a correspondingly extensive restriction over the operational space which extends as a central longitudinal bore through the impeller arrangement for the projectile which is equipped with such an impeller arrangement. In addition thereto, the previously known combustion chamber arrangement constructively affords only a relatively limited degree of freedom in the arranging and the dimensioning of the propellant for a high degree of effectiveness in the conversion of the combustion gases into lateral impulses at the applicable nozzle, inasmuch as the star-shaped supplying of the combustion chamber with propellant therein provides extremely unfavorable conditions for the throughput of the quantities of gas from the standpoint of flow dynamics.

SUMMARY OF THE INVENTION

Accordingly, in recognition of these prevalent conditions it is an object of the invention to provide an impulse propulsion unit of the above-mentioned type which, at a moderate radial expansion of the combustion chamber, facilitates a variation of the generated impulses within constructively broad limits, at a high degree of efficiency due to satisfactory flow conditions for the reaction gas quantities; and which can be equipped in one cross-sectional plane with a relatively large number of peripherally differently oriented impulse nozzles, and as a result is thereby especially adapted for the aimed for course correction of projectiles which are in the shape of subordinate-ammunition articles, as is described in more extensive detail in co-pending U.S. patent application Ser. No. 751,932, filed July 2, 1985; and German patent Appln. No. P 35 16 673.8, both assigned to the common assignee of the present application, the disclosures of which are incorporated herein by reference.

The foregoing object is essentially inventively attained in that the impulse propulsion unit of the type described herein has a propellant chamber in the shape of an axially elongated section from the hollow wall of a cylinder in which the annular space between the cylindrical inner and outer walls is subdivided through the intermediary of radial separating walls into peripherally neighboring chambers.

In accordance with the foregoing inventive object, the space available for the impulse propulsion unit at the given external dimensions is employable to an optimum extent for the receipt of propellant. The extent of depth in the direction of the nozzle axis; in effect, the radial depth relative to the longitudinal axis of the propulsion or impeller unit, can be freely selected in conformance with the constructive requirements, especially with regard to the diameter of the longitudinal bore at given caliber size, inasmuch as the volume of the combustion chamber is readily variable by means of its height over extremely wide limits. The geometry of the chamber in the shape of the hollow wall section of a cylinder facilitates a relatively simple determination over the surface extent of the propellant for undisturbed flow conditions of the quantities of the reaction gas which, for the generation of impulses, should themselves find their narrowest cross-section only and first during outlet through the nozzle. Hereby, the axis of the nozzle need not be symmetrically arranged in relationship with the longitudinal and peripheral extent of the chamber; thus, for instance, not necessarily located at half the height of the chamber; which, with consideration given to the profiling of the surface of the propellant for applicable correlation with the flow cross-section of the reaction gas will open up possibilities for simple constructive arrangements at given assembling conditions so as to, through displacement or tilting of the nozzle axis, impart to the direction of the impulses a certain overall orientation, for example, relative to the given center of gravity of the projectile.

BRIEF DESCRIPTION OF THE DRAWING

Additional alternatives and modifications, as well as further features and advantages of the invention, can now be readily ascertained from the following detailed description of an exemplary embodiment thereof, taken in conjunction with the generally schematic single FIGURE of the drawing which, in a perspective end view shown partly in section, illustrates the inventively constructed impulse propulsion unit.

DETAILED DESCRIPTION

The impulse propulsion unit 1 incorporates a hollow-cylindrical housing with a cylindrical inner wall 2, a coaxially arranged outer wall 3 and, respectively, annular upper and lower end walls 4, 5. As can be ascertained from the illustrated sectional view, the interior space of this housing is divided into a number of peripherally neighboring chambers extend 8 through the intermediary of radially extending separating walls 7 and in parallel with its longitudinal axis 6, and which chamber extend with a cross-section in conformance with the geometry of an annular segment along the axial length of the impulse propulsion unit 1 intermediate the end walls 4, 5. The segment which has been cut out in the illustrated drawing, extends from the middle plane of a separating wall 7 (to the left in the drawing) over a plurality of such chambers to the middle plane of a chamber 8 (in the drawing to the right, with a view directed towards the separating wall 7 for the subsequent neighboring chamber).

Each outer wall 3 of a chamber is broken through by a nozzle 9, for example in the middle plane of the chamber 8, the cross-section of the nozzle, as viewed from the outer shell surface 10, reduces towards the inside of the chamber 8. Preferably, the nozzle 9 extends itself along a protuberance 11 on the inner casing surface 12 of the outer wall 3 into the interior of the chamber 8, in order to have an adequate depth of material available in the direction of the nozzle axis 13 for the configuring of a desirable cross-sectional extent to provide for the aimed for effect of the nozzle 9.

The axis 13 of the nozzle 9, as a rule, extends orthogonally relative to the longitudinal axis 6 of the propulsion unit or driving mechanism; however, as initially referred to hereinabove, there can be constructively predetermined a certain inclination between both axes 13 and 6, when the thrust of the propulsion unit should also possess an axial component in addition to its main radial direction.

In the interior of each chamber 8, its separating walls 7 and the inner wall 2 are covered with a solid propellant 14, which extends in parallel with the longitudinal axis 6 up to the end walls 4, 5. The cross-hatching in the sectional illustration of the propellant in the central sectionally chamber 8 is adapted to emphasize that this covering constituted of propellant does not pertain to a compact solid member, but in the interest of obtaining the largest possible burning surface, consists of platelike or honeycombed buildings of charge supports; which are known per se for the supplying of reaction chambers in impulse propellant charge compositions for the most intense impact-like, in essence, large-surfaces conflagration of the propellent. In order to simplify the illustration in the drawing, the fastenings and interspaces in the stacks of the plates or honeycombs of propellant 14 have not been shown in detail.

In order to obtain a high degree of effectiveness for the impulse propulsion unit 1, it is important that the quantities of the reaction gases which are released during the burning down of the propellent charge, do not find a narrower flow cross-section anywhere in their direction of flow towards discharge through the nozzle 9, as that for providing the nozzle effect; in essence, the narrowest nozzle cross-section 15 which is governing for the formation of a reaction force. Inasmuch as, along the path from the end walls 4 and 5 and from the separating walls to the nozzle axis 13, there increases the quantity of the burning gases, this requisite is fulfilled through the extent of a concavely inwardly curved, practically point-symmetrical relative to the center of the nozzle 9 (which in cross-section extending through the axis 13 reduces logarithmically towards the center) external boundary surface 16 of the covering with propellant 14.

Inasmuch as this covering would evidence in the nozzle protuberance 11 extending into the chamber 8, a corresponding stepped rebounding, which restrict the fastening capabilities for the propellant 14 in the apparatus, and there allow for only still small quantities of propellant 14, it can be expedient, in accordance with the illustrated embodiment, that coaxially about the axis 13 of the nozzle, there be cut out behind the nozzle 9, a cylindrical open space 17 as an air scoop for the exhaust gases.

At given caliber size (outer diameter of the outer wall 3) and predetermined diameter of the longitudinal bore 18 which is surrounded by the inner wall 2, for a predetermined type of propellant 14, the essential parameter for the impulse dimensioning of the propulsion unit is the quantity of the propellant 14 which is available for the shock or impact-like burning, in essence, the axial length of the chamber 8 which can be covered with the propellant 14. The impulse propulsion unit 1, through a simple variation of its axial length while maintaining a standard caliber size, and at a preferred standard configuration of the geometry of the nozzles 9, can be correlated with different impulse requirements; whereby merely the increase in the logarithmic extent of the outer boundary surface 16 of the covering with the propellant 14 need be conformed with the changed conditions concerning the quantities of the combusted gas.

For the ignition of the propellant 14 there is symbolically simply provided to permit an ignition tube 19 to pass through the propellant 14 axially-parallel in front of the inner wall 2 along the height of the chamber 8; which can be triggered, for example, by means of an ignition control device (not shown) which is arranged above the upper end wall 4, when the therewith associated lateral thrust nozzle 9 is to be activated.

In the drawing it is not considered that during the assembling of the hollow-cylindrical multi-chamber impulse propulsion unit 1 into the structure of a projectile or other kind of ammunition article, through the longitudinal bore 18 there can extend mechanical constructional elements of the structure, or electrical, pneumatic or similar operative connections; for example, leading to a position-finding device for tracking the target. For the remainder, the cutout of this longitudinal bore 18 serves for the action of an ammunition article as known in the ammunition technology, such as the axial passage therethrough of a highly energetic material jet or projectile subsequent to the deformation of an insert by an explosive.

What is claimed is:

1. An impulse unit for lateral acceleration of a projectile comprising:
   a housing dispersed about a longitudinal axis having annular end walls and inner and outer cylindrical walls radially spaced from each other and extending between said end walls, thereby defining an annular, elongated space enclosed by said said walls;
   a plurality of nozzles disposed on an outer surface of said outer wall, each nozzle adapted to communicate with a propellant chamber disposed in said annular space;
   a plurality of separating walls radially extending between said inner and outer cylindrical walls to separate adjacent propellant chambers from one another and thereby dividing said annular space between the outer and inner cylindrical walls into a plurality of axially elongated segments circumferentially adjacent one another and separate from one another.

2. The impulse propulsion unit as claimed in claim 1 wherein each propellant chamber includes a covering constituted of propellant supported between the inner wall, separating walls and end walls of each chamber.

3. The impulse propulsion unit as claimed in claim 2 wherein the propellant has boundary surfaces spaced from the nozzle and arranged opposite the outer wall of said chamber and having a concavely arched portion facing in a direction towards the nozzle.

4. The impulse propulsion unit as claimed in claim 1 wherein a cylindrical open space is formed in the propellant covering of said chamber, said cylindrical open space being concentric with the nozzle.

5. The impulse propulsion unit as claimed in claim 1 wherein the nozzle is formed in a protuberance disposed on an inner surface of the outer wall of said propellant chamber.

6. The impulse propulsion unit as claimed in claim 1 wherein the nozzle is disposed equidistant between the two end walls and two separating walls of the chamber.

7. The impulse propulsion unit as claimed in claim 1 wherein the nozzle is disposed equidistant between the end walls of the chamber.

8. The impulse propulsion unit as claimed in claim 1 wherein the nozzle is neither equidistant from the separating walls nor equidistant between the end walls of the chamber.

9. The impulse propulsion unit as claimed in claim 1 wherein the nozzle is adapted to direct gases from the propulsion chamber in a direction at an angle to the longitudinal axis of the propulsion unit and thereby additionally impart an axial impulse to the projectile.

* * * * *